Figure 1:
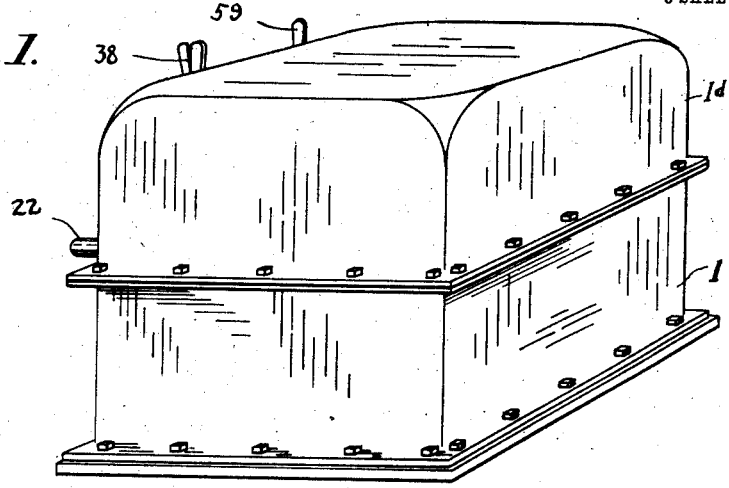

No. 883,431. PATENTED MAR. 31, 1908.
R. M. & M. C. THORNBURG.
POWER TRANSMISSION DEVICE.
APPLICATION FILED APR. 10, 1907.

8 SHEETS—SHEET 1.

WITNESSES:
James West
Ethel L. Lister

INVENTOR
Rufus M. Thornburg
Morton C. Thornburg
BY Thomas L. Ryan
ATTORNEY

No. 883,431.

PATENTED MAR. 31, 1908.

R. M. & M. C. THORNBURG.
POWER TRANSMISSION DEVICE.
APPLICATION FILED APR. 10, 1907.

8 SHEETS—SHEET 2.

WITNESSES:
James West
Ethel L. Lister

INVENTOR
Rufus M. Thornburg
Morton C. Thornburg.
BY Thomas L. Ryan
ATTORNEY

No. 883,431. PATENTED MAR. 31, 1908.
R. M. & M. C. THORNBURG.
POWER TRANSMISSION DEVICE.
APPLICATION FILED APR. 10, 1907.

8 SHEETS—SHEET 3.

WITNESSES:
James West
Ethel L. Lister

INVENTOR
Rufus M. Thornburg
Morten C. Thornburg
BY Thomas L. Ryan
ATTORNEY

No. 883,431.

PATENTED MAR. 31, 1908.

R. M. & M. C. THORNBURG.
POWER TRANSMISSION DEVICE.
APPLICATION FILED APR. 10, 1907.

8 SHEETS—SHEET 4.

WITNESSES:

INVENTOR
Rufus M. Thornburg,
Morton C. Thornburg;
BY
ATTORNEY

No. 883,431.

PATENTED MAR. 31, 1908.

R. M. & M. C. THORNBURG.
POWER TRANSMISSION DEVICE.
APPLICATION FILED APR. 10, 1907.

8 SHEETS—SHEET 5.

WITNESSES:
James West
Ethel L. Lister

INVENTOR
Rufus M. Thornburg.
Morton C. Thornburg.
BY
Thomas L. Ryan
ATTORNEY

No. 883,431. PATENTED MAR. 31, 1908.
R. M. & M. C. THORNBURG.
POWER TRANSMISSION DEVICE.
APPLICATION FILED APR. 10, 1907.

8 SHEETS—SHEET 6.

WITNESSES:

INVENTOR
Rufus M. Thornburg.
Morton C. Thornburg.
BY
ATTORNEY

No. 883,431. PATENTED MAR. 31, 1908.
R. M. & M. C. THORNBURG.
POWER TRANSMISSION DEVICE.
APPLICATION FILED APR. 10, 1907.

8 SHEETS—SHEET 7.

WITNESSES:
James West
Ethel L. Lister.

INVENTOR
Rufus M. Thornburg,
Morton C. Thornburg,
BY
ATTORNEY

No. 883,431. PATENTED MAR. 31, 1908.
R. M. & M. C. THORNBURG.
POWER TRANSMISSION DEVICE.
APPLICATION FILED APR. 10, 1907.

8 SHEETS—SHEET 8.

WITNESSES:

INVENTOR
Rufus M. Thornburg
Morton C. Thornburg,
BY
ATTORNEY

UNITED STATES PATENT OFFICE.

RUFUS M. THORNBURG AND MORTON C. THORNBURG, OF MUNCIE, INDIANA.

POWER-TRANSMISSION DEVICE.

No. 883,431.      Specification of Letters Patent.      Patented March 31, 1908.

Application filed April 10, 1907. Serial No. 367,409.

*To all whom it may concern:*

Be it known that we, RUFUS M. THORNBURG and MORTON C. THORNBURG, both citizens of the United States, and residents of the city of Muncie, Delaware county, Indiana, have invented a new and useful Power-Transmission Device, of which the following is a specification.

Our invention relates to devices for the transmission of power, and has for its object to provide a device whereby the power may be transmitted from the driving-shaft to the driven-shaft in such manner that the maximum speed to be transmitted to the driven-shaft may be so transmitted to it gradually.

Other objects of our invention are to provide facility whereby the direction of the movement of the driven-shaft may be reversed. Also to provide such device in compact form and in suitable incasement so as to be of utility generally in all classes of machinery where the transmission of power is practiced.

The principal features of our invention consist of a drum, adapted to be revolved by the driving-shaft, and so constructed and so mounted with reference to the shaft to be driven, and so connected thereto, that by shifting of the drum on a line at a right angle to that of the said driven-shaft the speed of the driven-shaft with reference to the speed of the driving-shaft may be varied.

The objects and purpose of our invention are accomplished by the novel construction, combination and arrangement of parts and the mechanism described in this specification and illustrated in the accompanying drawings.

Similar characters of reference refer to similar parts throughout the several views, in which:—

Figure 2:
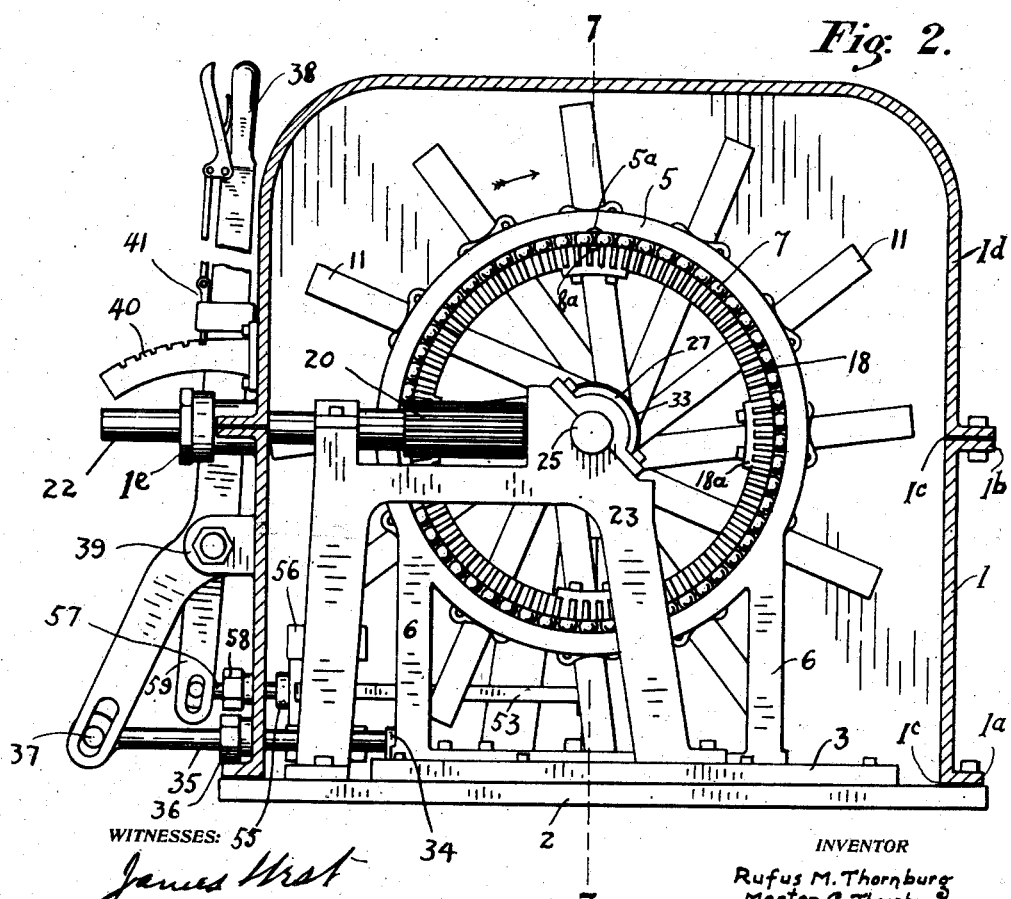
Figure 3:
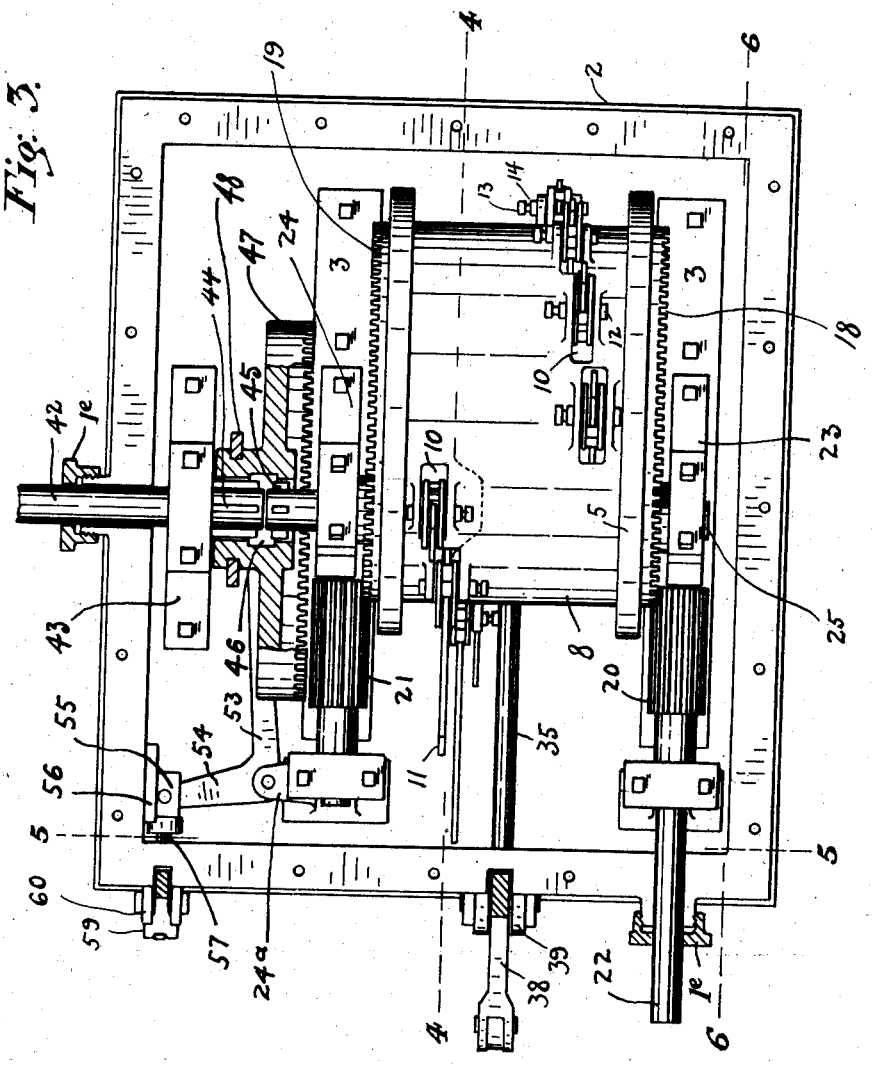
Figure 4:
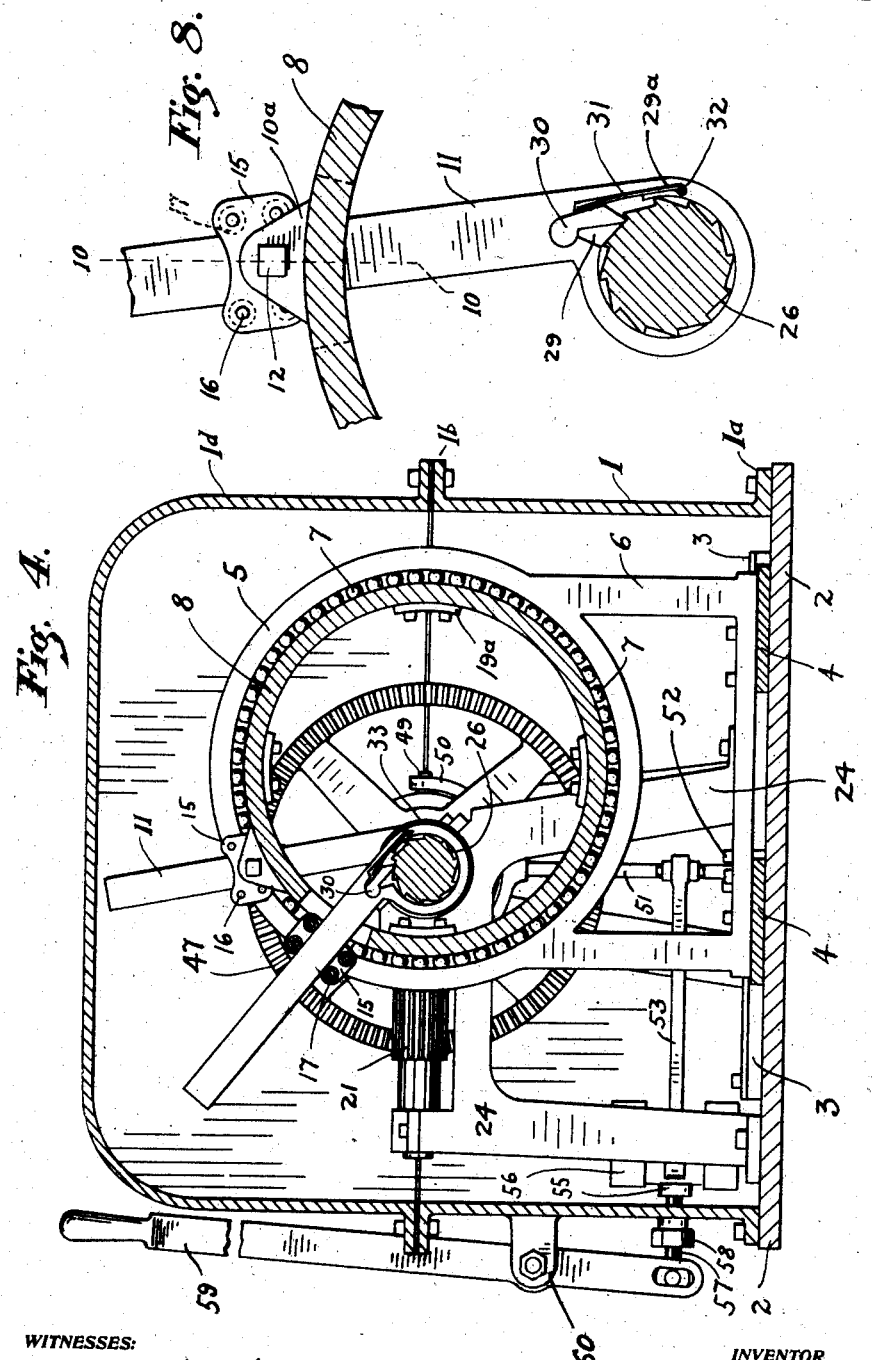
Figure 5:
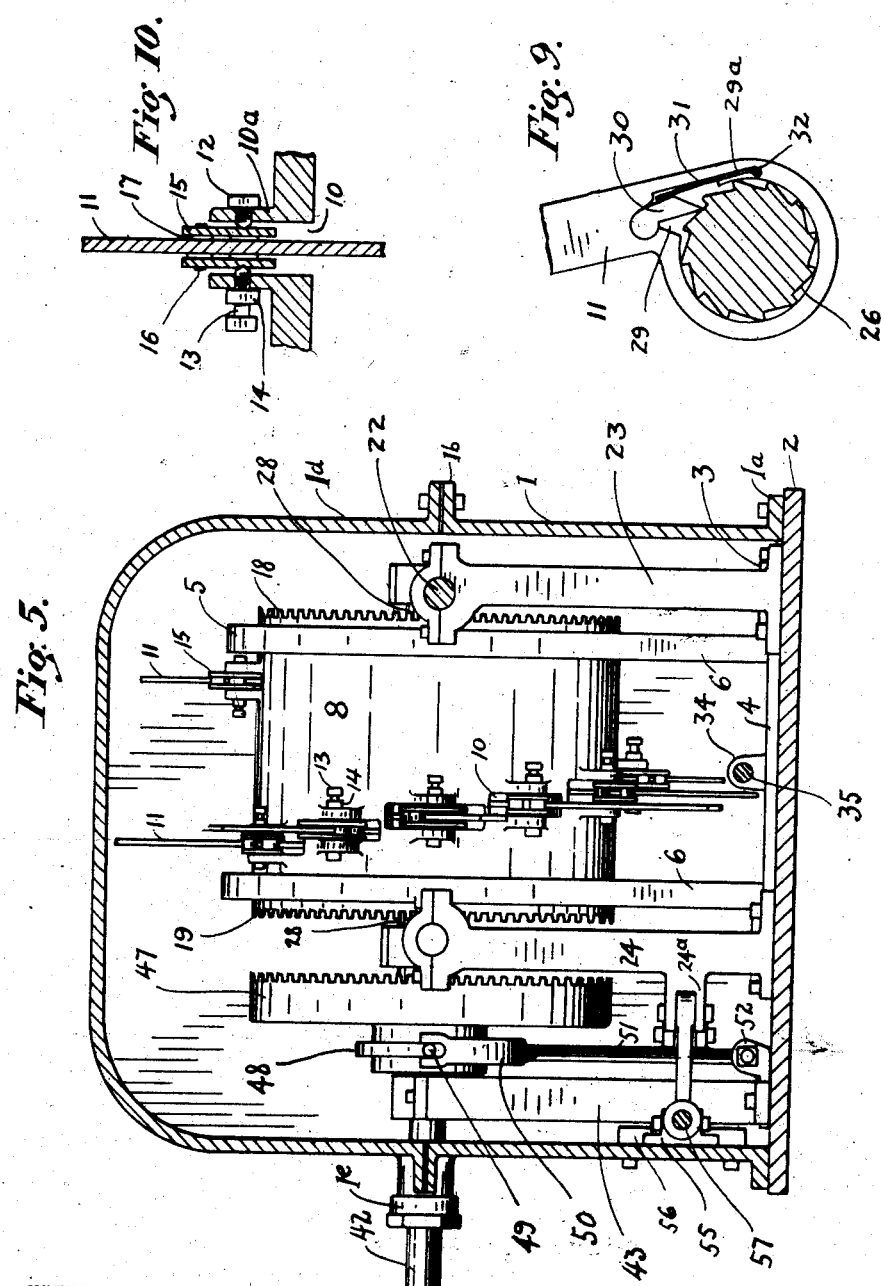
Figure 6:
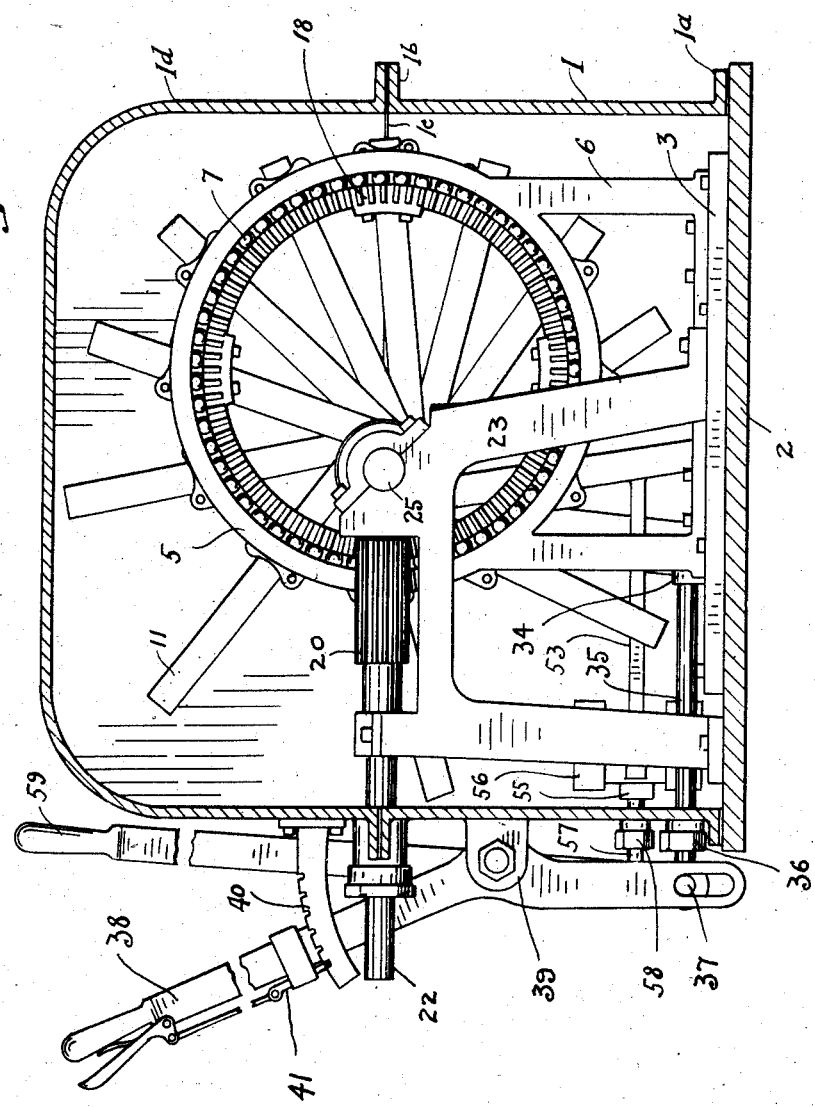
Figure 7:
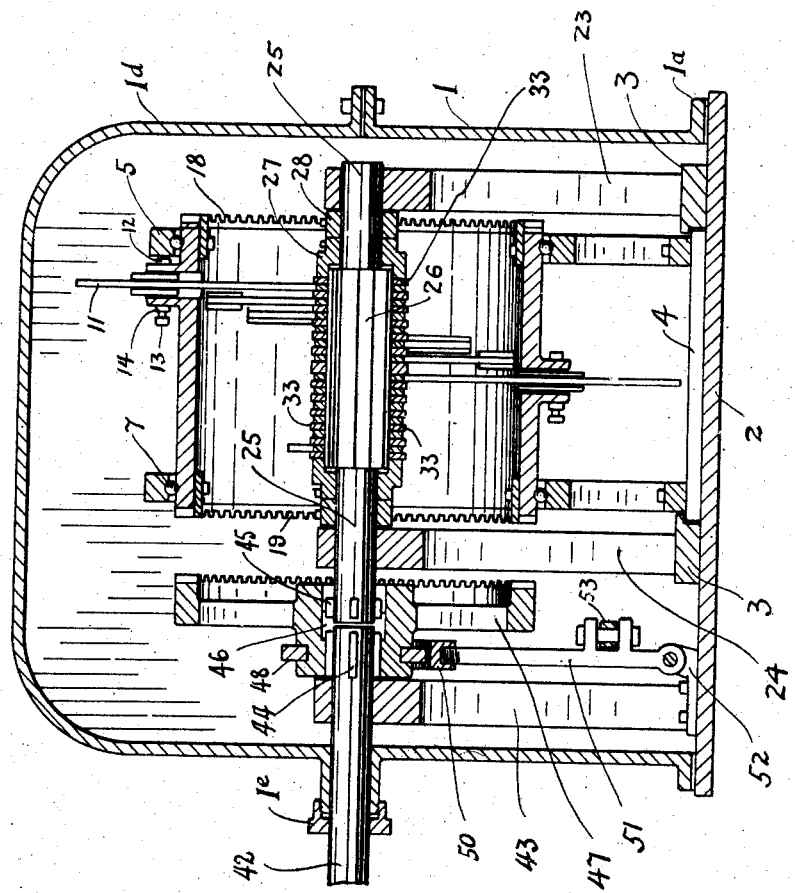
Figure 11:
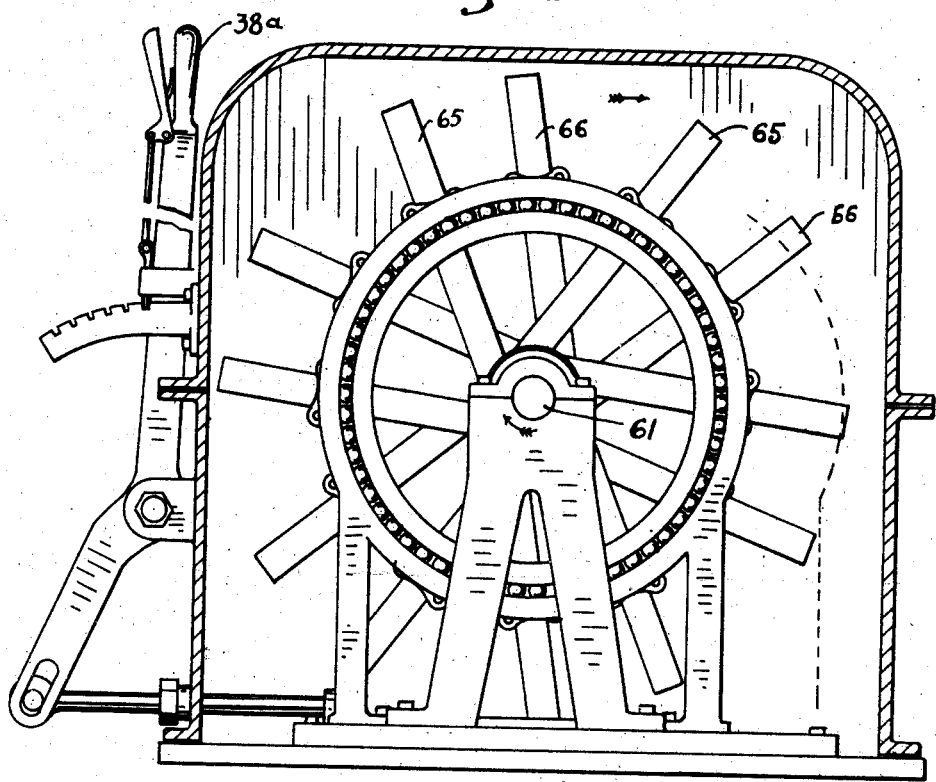
Figure 13:
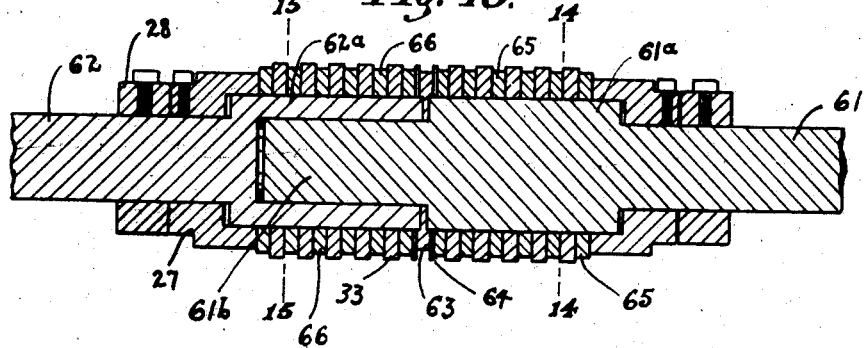
Figure 12:
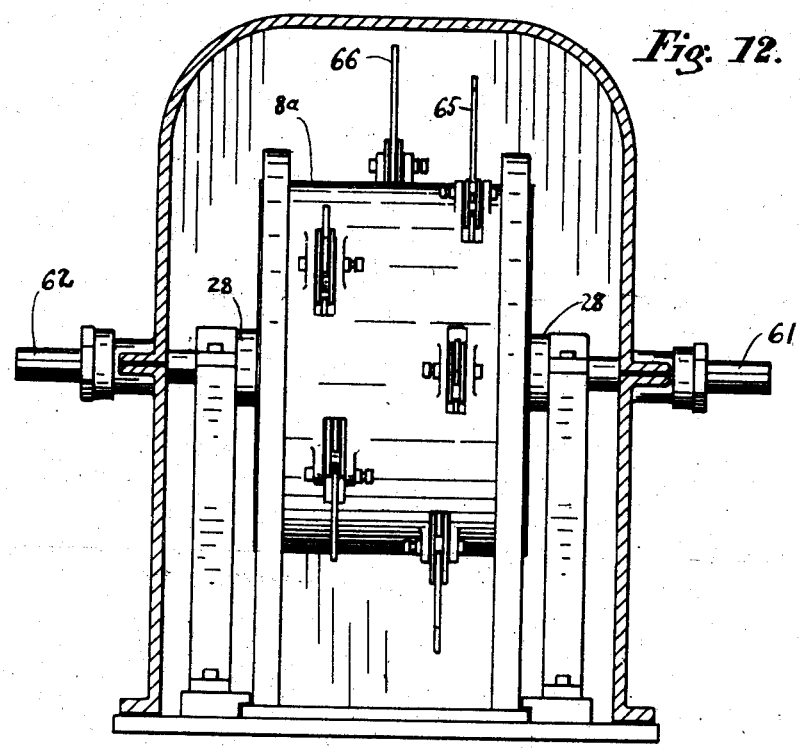

Figure 1 is a perspective view of our invention complete, inclosed in the suitable casement shown. Fig. 2 is a front view of our invention, the casement being shown as having its front-wall broken away. Fig. 3 is a plan view, the cover having been removed, and the central portion of the rack-wheel being shown in section, the drum being in the position occupied when the driven-shaft is being propelled at maximum speed. Fig. 4 is a vertical longitudinal sectional view taken on the line 4—4 Fig. 3, the cover being shown in position. Fig. 5 is a vertical transverse sectional view, taken on the line 5—5 Fig. 3, the cover being shown in position. Fig. 6 is a vertical longitudinal sectional view taken on the line 6—6 Fig. 3, the cover being shown in position. Fig. 7 is a vertical transverse sectional view on the line 7—7 Fig. 2. Fig. 8 is a detached enlarged view of the spoke showing its slide-rocker connection to the drum, and its ratchet-connection to the driven-shaft, as the latter connection appears when in direct engagement. Fig. 9 is a similar detached view of portion of the spoke and its ratchet-connection aforesaid as it appears when not in direct engagement. Fig. 10 is a detached transverse sectional view, taken on the line 10—10 Fig. 8. Fig. 11 is a front view, and Fig. 12 is a side view of a modified form of device in which our invention is embodied, the casement in each view being shown as having its walls broken-away. Fig. 13 is a detached enlarged sectional view of the divided shaft employed in the form of device shown in Fig. 11 and 12, and Fig. 14 and 15, are transverse sectional views taken on the lines 14—14, and 15—15 respectively, in Fig. 13.

The principles of our invention are carried out and applied in the mechanism described herein which we have contemplated as being the best form of device and construction, combination and arrangement of parts for such application.

In the form of embodiment given our invention herein, we have shown it as inclosed in a substantial casement as shown in Fig. 1, of such form as to render the invention desirable for use in motor-vehicles and the like. This casement is made of metal of suitable thickness and is composed of the case 1, having continuous flanges 1$^a$ and 1$^b$ at its bottom and top respectively whereby it may be secured rigidly by bolts to the base-plate 2 and to the cover 1$^d$; the packing 1$^c$ is interposed at the lines of the jointure of the case to the base-plate and to the cover so as to prevent the escape of oil which it is intended shall be retained in the case and in which the operative parts of the device may be bathed at all times. Suitable packing boxes are provided at the places where required, as will be hereinafter referred to.

Rigidly secured to the base-plate, a proper distance apart are the guide-bars 3, suitably rabbeted on their facing edges, so as to retain slidingly in correct position the guide-plates 4, upon which guide-plates the yokes 5 which are sustained by the integrally formed legs 6, are supported. These yokes are machined to the line of a true circle and each have a suitable track for the steel balls 7, which roll in a correspondingly provided track in the periphery of the drum 8, whereby it is retained in correct position and will be free to revolve in the yokes with minimum friction.

The semicircular openings 5ª, and 8ª, provided in the yokes, and the drum respectively, afford proper facility for the introduction of the balls in place. This drum is of substantial thickness and suitable width, as shown by the drawings, and is provided with a succession of slots 10, correctly positioned so as to permit the passing through them, of the spokes 11, the function arrangement and construction of which spokes will be hereinafter referred to. Formed integral with the drum and on either side of each of the slots 10, are the risers 10ª. The screws 12 and 13 having their ends hardened and pointed, are screwed into these risers and towards each other, the screw 12 becoming permanently fixed. The screw 13 is of increased length, whereby nice adjustment of the distance between the points of the screws may be obtained, and by the lock nut 14 may be maintained. On the points of these screws 12 and 13 are supported the slide-rockers consisting each of a pair of oppositely connected plates 15, having conical shaped depressions in their outer sides, engaged by the said screws 12 and 13, and retained properly apart by the pins 16, upon which are journaled the rolls 17, all as plainly shown in Fig. 8 and 10. By this device the spokes 11 are free to oscillate about the center-bearings of the risers 10ª, and to move slidingly in said slide-rockers.

Secured rigidly on either side of the drum by the flanges 18ª and 19ª are circular racks 18 and 19, which mesh with the pinions 20 and 21, both being suitably journaled in the substantial standards 23 and 24 which are rigidly secured to the base-plate 2. We have shown the pinion 20 journaled at the side of the housing nearest that portion of the drum from whence the power is transmitted into the certain spokes for the increase of speed in the driven-shaft, when the drum is shifted, as will be hereinafter referred to. The pinion 21 performs no function except to engage the rack-wheel when desired, as will be hereinafter disclosed.

Journaled in the standards 23 and 24 is the transverse-shaft, which, for assisting to the clear understanding of our invention we have designated the driven-shaft 25, the central portion of this driven-shaft 25 is of enlarged diameter, as shown in Fig. 7, and is provided with the ratchet-teeth 26, which extend continuously throughout the length of said enlarged portion, and the purpose whereof will be presently disclosed. 27 and 28 designate suitable collars provided with set-screws, the function of the collars 27 being to effect and maintain proper adjustment and location transversely of the spokes 11, the enlarged ends of which spokes surround the enlarged portion of the driven-shaft as shown in Fig. 7 and 8. The purpose of the collars 28 is to maintain the driven-shaft 25 in correct position transversely with reference to the standards in which it is journaled.

By reference to Fig. 8, the construction and arrangement of the spokes 11, will be readily understood; the end of each of these spokes, is enlarged sufficiently so as to encircle the enlarged portion of the driven-shaft 25. Each spoke has the recess 29 cut therethrough and of the conformation as shown, wherein resides the pawl 30, yieldingly pressed toward the shaft and against the ratchet-teeth, by the leaf-spring 31. The fixed end of this leaf-spring resides in the ensmalled channel portion 29ª of the recess 29, enlarged slightly at its bottom 32. The end of the spring is bent abruptly so that when placed in position with its bent-end in the recess 32, it will not slip away from the desired position as shown. When the drum is on the position as shown in Fig. 2, the spokes and the pawls thereof occupy the positions with reference to the ratchet-teeth as shown in Fig. 8; when the drum is in the position as shown in Fig. 3 and Fig. 6 the angles between the spokes having been changed, one spoke only is in positively direct engagement with the driven-shaft; the pawls of the other spokes are apart from the base of the ratchet-teeth, as indicated in Fig. 9, in varying degrees, according to the varying degrees of angularity between the spokes.

33 designate metallic rings of proper thickness and diameter interposed between the collars 27 and the outer spokes, and between the spokes, whereby the spokes are kept properly separated from each other and maintained in alinement, and the pawls and springs are like-wise retained in proper position.

Rigidly secured to the guide-plate 4 is the lug 34 into which is screwed the rod 35 which passes through the packing box 36, and has the roller-bearing 37 at its outer end, adapted to be connected to any suitable moving means, secured either adjacent to our invention or at a distance therefrom. As a suitable means for accomplishing the movement of the bar 35, we have employed the lever 38 pivoted on the lugs 39 provided on the case 1, and having the sector-bar 40 and locking means 41 whereby the drum 8 may be moved to and locked in different desired positions.

Sufficient description has thus far been given to disclose the essential features of our invention. When the driven-shaft is being operated at the slow or normal speed the parts of our invention occupy the position as shown in Fig. 2. Power applied to the shaft 22 is transmitted through the pinion 20 and the rack 18 whereby the drum is revolved in the direction indicated by the arrow.

All of the spokes are in engagement, by virtue of the pawls, and ratchet-teeth, directly with the driven-shaft. When increase of the revolutions of the driven-shaft is desired, the lever 38 is moved thereby shifting the drum from its normal position as shown in Fig. 2, towards the position occupied as shown in Fig. 6.

Immediately all the spokes but one are disengaged from the ratchet connection with the driven-shaft, the spoke which retains its engagement being the one which measures the minimum distance between the slide-rocker and the driven-shaft, which distance then represents the actual driving radius of the wheel. The distance from the point of engagement of the spoke in the drum, and the driven-shaft actuated by the spoke being thus reduced and the speed of the revolution of the drum remaining normal, the motion of the driven-shaft will be accelerated. As the drum revolves the spokes one after another singly will come into the engagement referred to as the shortest distance from the slide-rocker to the driven-shaft is reached, and at the engagement at that point the ratchet connection will appear as shown in Fig. 8. All of the spokes other than the one directly and actually engaged, have their pawls out of direct engagement with the ratchet-teeth, as shown in Fig. 9, in varying degrees of measure.

By virtue of the fact that the spoke which happens to be in position nearest the horizontal line of the center of the shaft, will be the one to retain its engagement with the ratchet-tooth, the wear of the spokes and the ratchet-teeth will be distributed generally.

It is obvious that as the shifting of the position of the drum is continued and the operative length of the engaged spoke is accordingly shortened, the speed of the driven-shaft will be correspondingly increased, until, coincident with the arrival of the drum at the position as shown in Fig. 6, the maximum speed possible to be given to the driven-shaft will have been gradually so given.

For accomplishing the driving reversibly of the driven-shaft directly in connection with and as an extension of the driven-shaft 25, we provide the shaft 42 journaled in the substantial standard 43, provided on its inner end, which extends near to the end of the shaft 25, with the feathers 44 rigidly secured to the shaft 42. Like feathers 45 much shorter in length are rigidly secured to the driven-shaft 25. Journaled on the shaft 42 and the driven-shaft 25 and slidingly disposed thereon with suitable slots engaging the feathers 44, and 45, and having the annular recess 46 extending about the shafts at their line of separation is the rack-wheel 47 which resides out of engagement with the pinion 21, and forms a coupling whereby the shaft will at all times be revolved coincidently with the revolution of the driven-shaft 25.

48 designates a ring loosely retained on the hub of the rack-wheel, as plainly shown in Fig. 3, Fig. 5 and Fig. 7. This ring is provided with pins 49, which are engaged by the yoke 50 supported on the rocker-bar 51 which is pivoted in the suitable bearing 52 secured to the base-plate. Pivotally connected to the rocker-bar 51 is the bell-crank 53 journaled on the suitable bearing 24$^a$ formed integrally upon the standard 24, and having its arm 54 pivotally connected to the cross-head 55 slidingly retained in the guide-bars 56.

57 designates a rod screwed into the cross-head 55, and passed through the packing box 58, and provided with suitable bearing at its outer end to engage suitable moving means such as the lever 59 journaled on the lugs 60 formed integral with the case.

It will be observed that in order to obtain a reverse motion of the shaft 42 the lever 59 is moved whereby the rack-wheel 47 is thrown into mesh with the pinion 21. Simultaneously with the engagement of the rack-wheel with the pinion it is disengaged from its connection with the feathers 45 and the driven-shaft 25, and the shaft 42 will move in reverse direction accordingly.

It is not claimed that the reverse movement of the shaft 42 is obtained during any speed other than the normal speed of the driving-shaft, and the combination of this reversing mechanism with the speed regulating mechanism is effected in our construction to render the device available for practical use where a reverse motion of the driven-shaft is desired. When it is desired to dispense with the reversing mechanism shown, the rack-wheel and its parts may be removed, and the driven-shaft 25 may be of increased length to extend outside the casement to any suitable length.

In assembling our invention, the yokes 5 which are rigidly secured by bolts to the guide-plates 4 are slid into position on the base-plate 2 between the guide-bars 3 which are bolted to the base-plate. The drum 8 stripped of the slide-rockers is then placed in position within the yokes. With the introduction then of the steel balls 7 the drum will assume position accurately connected with the yokes, as shown in the drawings. The standards 23 and 24 are then bolted into position, then the driven shaft 25 is passed transversely into the drum, and one after the other, the spokes which have been passed through the slots 10 of the drum, and the pawls and springs and the rings 33, are placed in position; the collars 27 and 28 are then placed in position and the shaft is then set into the journal bearings therefor in the standards 23 and 24, and the bearings closed in the usual way. Then the slide-rockers are slipped into position over the spokes and between the risers of the drum whence the adjustment of same as heretofore described is completed. The case 1 is then bolted securely in position on the base-plate 2; then the driving-shaft 22 is placed in position, the pinion 20 coming into mesh with the rack 18, and the journal-box of the standard 23 being closed in the usual way. The bar 35 is then inserted through the packing-box 36 and screwed into the lug 34, and the lever 38 connected thereto as shown in Fig. 2, the standard 43 having the shaft 42 journaled therein (the said shaft having disposed thereon, the rack-wheel 47) is placed in position (the hub of the rack-wheel in engagement with the driven-shaft 25) and then bolted into secure position on the base-plate. Then the rocker-bar 51 bearing the yoke is placed in position, and the bell-crank 53 connected thereto and to its bearing on the leg of the standard 24. The guides 56 are bolted to the wall of the case and slidingly retain the cross-head 55 into which cross-head is connected the arm 54 of the bell-crank. The bar 57 is then passed through the packing-box 58, and screwed securely in to the cross-head. Then the lever 59 journaled in the lugs 60, is connected by suitable bolt to the said bar 57. The cover is then set in place on the flanges of the case 1, a layer of packing being interposed and is bolted securely in position and lastly the packing boxes $1^e$ are closed.

In the modified form of device wherein our invention is embodied, it is intended that the driving-power shall be applied directly to a shaft arranged with its center common to that of the driven-shaft. To attain this end, the construction, combination, and arrangement of parts are as shown in Figs. 11 and 12.

In all respects generally, the mechanical construction and arrangement of the parts, except as hereinafter specified, are unchanged. 61 designates the driving-shaft, with the enlarged portion $61^a$ of such length, that together with the like enlarged portion $62^a$ of the driven-shaft 62, the collars 27 and 28, the spokes 65 and 66 and the rings 33 may be arranged transversely in the manner as shown in Fig. 13.

Figure 14:
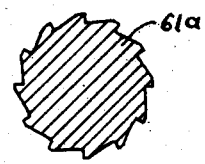
Figure 15:
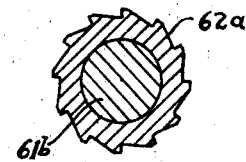

At the central vertical line of division between the driving-shaft 61 and the driven-shaft 62 is the rabbeted washer 63, on either side of which are the rings 64. The integral extension $61^b$ of the driven-shaft 62 and the bore therefor, are so machined that a true bearing is obtained thereat. The ratchet-teeth are arranged as right and left on the shafts 61 and 62 respectively, as shown in Fig. 14 and 15; the spokes 65 and 66 will accordingly be arranged in like manner, and appear as shown in Fig. 11.

Power is applied to the driving-shaft intended to be revolved in the direction as indicated by the arrow in Fig. 11; with the engagement of the pawls of the spokes 65 the drum $8^a$ will be caused to revolve coincidently with the revolution of the shaft. In its revolution it actuates the spokes 66 which turn the driven-shaft 62, the speed and direction of the movement of the two shafts being the same.

With the movement of the lever $38^a$ and the shifting of the drum in the direction of the arrow and the dotted line position, shown in Fig. 11, the one spoke of the six spokes 65, which passes the line measuring the shortest distance from the slide-rocker to the shaft, is in positively direct contact and engagement with the ratchet of the driving-shaft 61, the driving radius being thus shortened, the speed of the revolution of the drum will be inceased, whereby the driven-shaft 62 will be caused to revolve more rapidly; thus, as the shifting of the drum is continued, the speed of the driven-shaft will be gradually accelerated until its maximum degree has been reached.

Thus we obtain by our invention a device whereby from a speed maintained at a certain and unvarying degree in the driving-shaft, a higher speed in the driven-shaft may be accomplished gradually, positively and without vibration or slippage. Also, as between the minimum and maximum speeds of the driven-shaft, the degree or measure thereof may be varied to a nicety. While we have shown the shifting means whereby the position of the drum is regulated, as being rigged to be "set" for six different speeds, it will be understood that such number of different set degrees of speed, as may be desired, can be provided for in this shifting and holding means without departing from the nature or principle of our invention.

What we claim as our invention and desire to secure by Letters Patent is—

1. A device of the kind described comprising a driving-shaft, a driven-shaft, a drum adapted to rotate about the driven-shaft, power transmitting connections between the driving-shaft and the drum, spokes to transmit motion from the drum to the driven-shaft in movable engagement with the drum and the driven-shaft, and means to vary and maintain the location of said drum with reference to the axial line of the driven shaft whereby all of the spokes but the one measuring the shortest distance from the drum to the axial line of the driven-shaft will be thrown out of actual engagement.

2. A device of the kind described, comprising a driving-shaft, a driven-shaft, a drum adapted to rotate about the driven-shaft, power-transmitting connections between the driving-shaft and the drum, means to vary and maintain the location of said drum with reference to the axial line of said driven-shaft, means to transmit motion from the drum to the driven-shaft including a plurality of spokes pivotally-slidingly connected to said drum, and ratchet connections between the said motion-transmitting means and the driven-shaft.

3. A device of the kind described, comprising a driving-shaft, a driven-shaft, a drum adapted to rotate about the driven-shaft, power-transmitting connections between the driving-shaft and the drum, means to vary and maintain the location of said drum with reference to the axial line of said driven-shaft, means to transmit motion from the drum to the driven-shaft including a plurality of spokes pivotally-slidingly connected to said drum, ratchet connections between the said motion transmitting means and the driven-shaft, a supplemental driven-shaft detachably coupled to the driven-shaft, a rack-wheel secured on said supplemental driven-shaft so as to slide but not to rotate thereon, an idler-pinion actuated by the drum, and means to throw the rack-wheel into engagement with the idler-pinion whereby the supplemental driven-shaft will be revolved in a direction opposite to that of the drum.

4. A device of the kind described, comprising a base-plate, a driving-shaft and a driven-shaft mounted thereon, a carriage adapted to be moved on a line at a right angle to the axial line of the driven-shaft, a drum mounted revolubly in said carriage, power-transmitting connections between the driving-shaft and the drum, a lever to move said carriage, means to lock said carriage in different positions, ratchets on said driven-shaft, spokes to engage said ratchets having their free ends extended through the drum, slide-rockers secured to the drum to slidingly-pivotally retain said spokes, a casement including a flanged bottom member, and a like cover-member adapted to be joined and secured together at the line of the center of said shafts.

5. A device of the kind described comprising a base-plate, a driving shaft and a driven shaft mounted thereon, a carriage adapted to be moved on a line at a right angle to the axial line of the driven-shaft, a drum mounted revolubly in said carriage, power transmitting connections between the driving shaft and the drum including a rack secured to the lateral face of the drum and a pinion actuated by the driving shaft to engage said rack, a lever to move said carriage, means to lock said carriage in different positions, ratchets on said driven-shaft, spokes to engage said ratchets having their free ends extended through the drum slide rockers secured to the drum to slidingly-pivotally retain said spokes, a supplemental driven-shaft detachably coupled to the driven-shaft, power-transmitting connections between the drum and supplemental driven-shaft including a rack secured to the lateral face of the drum, and an idler-pinion actuated thereby, a rack-wheel secured on said supplemental driven-shaft so as to slide but not to rotate thereon, and means to throw the rack-wheel into and out of engagement with the idler pinion, a casement including a flanged bottom member and a like cover-member adapted to be joined and secured together at the line of the center of said shafts.

6. A device of the kind described, comprising a driving-shaft and a driven-shaft journaled coaxially, joined together so as to be revoluble independently of each other, a drum adapted to rotate about said joined shafts, devices movably connected to the driving-shaft and in movable engagement with the drum to transmit the motion of the shaft to the drum and to rotate the drum devices in movable engagement with the drum and movably connected to the driven-shaft to transmit the rotary motion of the drum to the driven shaft, means to vary and maintain the location of said drum with reference to the axial line of the shafts.

7. A device of the kind described, comprising a driving shaft and a driven-shaft journaled coaxially, joined together so as to be revoluble independently of each other, a drum adapted to rotate about said joined shafts, devices to transmit motion from the driving-shaft to the drum including a plurality of spokes slidingly-pivotally connected to said drum, ratchet connections between said motion-transmitting devices and the driving-shaft, devices to transmit motion from the drum to the driven shaft including a plurality of spokes pivotally-slidingly connected to said drum, and ratchet-connections between said motion-transmitting devices and the driven-shaft.

8. A device of the kind described, comprising a base-plate, a driving shaft and a driven-shaft mounted on said base-plate journaled coaxially, joined together so as to be revoluble independently of each other there being ratchet-teeth on said shafts, the said ratchet teeth of one being disposed in a direction opposite to those of the other, a carriage adapted to be moved on a line at a right angle to the axial line of the shafts, a drum mounted revolubly in said carriage and adapted to rotate about said joined shafts, spokes slidingly-pivotally connected to the drum, pawls in said spokes to engage the ratchets in said driving shaft, spokes pivotally-slidingly connected to the drum and pawls in said spokes to engage the ratchets in said driven-shaft.

In testimony whereof we have hereunto signed our names to this specification, in the presence of two subscribing witnesses.

RUFUS M. THORNBURG.
MORTON C. THORNBURG.

Witnesses:
ELMER V. CHARNEAU,
THOMAS L. RYAN.